United States Patent Office 3,538,089
Patented Nov. 3, 1970

3,538,089
5-NITRO-2-THIAZOLYL-OXAMIDES
Paul Schmidt, Therwill, and Max Wilhelm, Allschwil, Switzerland, assignors to Ciba Corporation, New York, N.Y., a corporation of Delaware
No Drawing. Continuation-in-part of application Ser. No. 529,199, Feb. 23, 1966. This application Nov. 21, 1967, Ser. No. 684,617
Claims priority, application Switzerland, Mar. 5, 1965, 3,088/65; Feb. 9, 1966, 1,810/66; Dec. 2, 1966, 17,269/66
Int. Cl. C07d 91/34
U.S. Cl. 260—243                                                                      13 Claims

ABSTRACT OF THE DISCLOSURE

New compounds of the formula

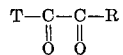

in which T stands for an optionally substituted 5-nitro-2-thiazolylamino radical and R for an optionally substituted amino group; e.g. the N-(5-nitro-2-thiazolyl)-oxamide. Use: antiparasitary and antibacterial agents.

CROSS-REFERENCES TO OTHER APPLICATIONS

This is a continuation-in-part of our copending application Ser. No. 529,199, filed Feb. 23, 1966 and now abandoned.

SUMMARY OF THE INVENTION

The present invention relates to new 5-nitro-2-thiazolyl-oxamides. Especially it concerns 5-nitro - 2 - thiazolyl-oxamides of the formula

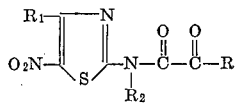

in which $R_1$ and $R_2$, which may be identical or different, represent lower alkyl radicals or preferably hydrogen atoms and R stands for an amino group, and as the case may be, their salts, and pharmaceutical compositions, feedstuffs and additives to feedstuffs containing said compounds.

Lower alkyl groups are e.g. methyl, ethyl, propyl, isopropyl groups or linear or branched butyl, pentyl or hexyl groups which may be linked in any desired position. The amino group R is unsubstituted or mono- or di-substituted; it is more especially a tertiary amino group. Suitable substituents are above all aliphatic hydrocarbon residues which may be interrupted by hetero atoms such as nitrogen, oxygen or sulfur atoms and/or substituted by hydroxyl groups or halogen atoms such as chlorine or bromine atoms, such as alkyl, hydroxyalkyl, halogenalkyl, alkenyl, cycloalkyl, cycloalkyl-alkyl, cycloalkenyl, cycloalkenyl-alkyl, aralkyl or alkylene residues, or oxa-, aza- or thia-alkylene residues or lower alkoxy-lower alkyl radicals. Suitable alkyl groups are above all lower alkyl groups e.g. those mentioned above; suitable alkenyl groups are especially lower alkenyl groups such as allyl or methallyl groups; particularly suitable cycloalkyl groups are cyclopentyl, cyclohexyl or cycloheptyl residues; specially preferred cycloalkenyl groups are cyclopentenyl or cyclohexenyl residues. Aralkyl radicals are preferably phenyl-lower alkyl radicals which may be substituted by lower alkyl groups, such as those mentioned above, lower alkoxy groups, such as methoxy or ethoxy groups, halogen atoms, such as chlorine or bromine atoms, and/or trifluoromethyl groups; such as benzyl, α-phenylethyl or β-phenylethyl residues. Alkylene radicals whose alkylene chain may be interrupted by hetero atoms, are especially alkylene radicals having 4 to 7 chain carbon atoms or mono-oxa-, -aza- or -thia-alkylene having 5 to 7 chain members in which the hetero atoms are preferably separated from the amino nitrogen atom by at least two carbon atoms, such as butylene-(1,4), pentylene-(1,5), hexylene-(1,5), hexylene-(1,6), heptylene-(2,6), 3-oxa- or 3-aza-pentylene-(1,5), 3-phenyl-3-aza-pentylene-(1,5), 3-lower alkyl-3-aza-pentylene-(1,5) such as 3-methyl- or 3-ethyl-3-aza pentylene-(1), 3-aza-hexylene-(1,6), 4-methyl-4-aza-heptylene-(2,6) or 3-thia-pentylene-(1,5) residues. A preferred lower alkoxy-lower alkyl radical is the β-methoxyethyl residue. A hydroxy-alkyl or halogenalkyl radical is especially a lower hydroxyalkyl or halogenoalkyl radical such as the β-hydroxyethyl, β-chloroethyl or γ-bromopropyl radical.

The amino group R is preferably a lower dialkylamino group or above all a pyrrolidino, piperadino, hexamethylenimino, heptamethylenimino, morpholino or thiomorpholino group or a piperazino group such as the N-methyl-piperazino group.

The new compounds possess valuable pharmacological, especially antiparasitary and antibacterial properties. Above all, they act against protozoae and worms and act, e.g. in the infested animal for example mice, against Gram-positive and especially against Gram-negative bacteria, e.g. *Salmonella typhi* or coli bacilli, such as *Escherichia coli*. As has been demonstrated by experiments for instance with hamsters, the new compounds are particularly active against trichomonades and amoebae, above all against amoebae in the liver and, when given, for example, to mice and sheep, also against schistosomes. Furthermore, they act against coccidiae and the pathogenic germs causing enterohepatitis (black head). Accordingly, the new compounds are useful as antiparasitic and antibacterial agents, and also as urine disinfectants. They are particularly suitable for the treatment of conditions produced by the afore-mentioned pathogens. The new compounds are also valuable intermediates for the manufacture of other useful products.

Special mention is deserved by the compounds of the formula

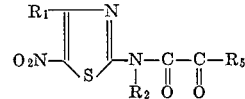

in which $R_1$ and $R_2$ each represents a lower alkyl radical or preferably a hydrogen atom and $R_3$ an unsubstituted amino group a mono-lower alkylamino radical or a di-lower alkylamino residue, a pyrrolidino group or more especially a morpholino, N-methyl-piperazino or piperidino residue, e.g. the $N^1,N^1$-(1,5)-pentylene)$N^2$-(5-nitro-2-thiazolyl)-oxamide, $N^1,N^1$(3-oxa - 1,5 - pentylene)-$N^2$-(5-nitro - 2 - thiazolyl)-oxamide and $N^1,N^1$-(3-methyl-3-aza-1,5-pentylene)-$N^2$-(5-nitro - 2 - thiazoly)-oxamide.

Especially useful antiparasitary and antibacterial agents are the compounds of the formula

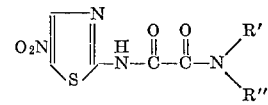

in which R′ and R″ each represents a hydrogen atom or a lower alkyl group, especially a methyl group, which e.g. show in the hamster on administration of two oral doses each of 60 to 100 mg./kg. a significant amoebicidal action.

The new compounds are manufactured by known methods.

For example, a compound of the formula

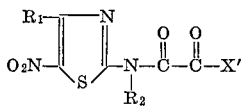

in which $R_1$ and $R_2$ have the meanings mentioned above and X' is a halogen atom, especially a chlorine or bromine atom, is reacted with a compound of the formula RH in which R has the meaning given above.

The reaction is carried out in the usual manner, preferably in the presence of a solvent and/or diluent, if desired or required in the presence of a condensing agent such as a basic condensing agent, at room temperature or with cooling or heating, under atmospheric or super-atmospheric pressure.

According to another process for the manufacture of the new compounds a compound of the formula

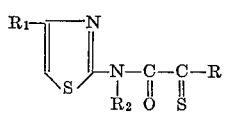

in which R, $R_1$ and $R_2$ have the above meanings—is reacted with nitric acid (preferably used in the concentrated or fuming form) in the presence of concentrated sulfuric acid.

Compounds that contain salt forming groups, i.e. basic groups are obtained in the free form or in the form of their salts depending on the reaction conditions employed.

From the bases therapeutically acceptable salts can be prepared with acids, e.g. therapeutically acceptable acids such as hydrohalic, sulfuric or phosphoric acids, nitric or perchloric acid; aliphatic, alicyclic, aromatic or heterocyclic carboxylic or sulfonic acids such as formic, acetic, propionic, oxalic, succinic, glycollic, lactic, malic, tartaric, citric, ascorbic, hydroxymaleic, dihydroxymaleic or pyruvic acid; phenylacetic, benzoic, para-aminobenzoic, anthranilic, para-hydroxybenzoic, embonic, salicyclic or para-aminosalicyclic acid; methanesulfonic, ethanesulfonic, hydroxy-ethanesulfonic, ethylenesulfonic acid; toluenesulfonic, naphthalenesulfonic acids or sulfanilic acid; methionine, tryptophan, lysine or arginine. On the other hand, it is also possible to obtain from acid compounds salts with bases, such as metal hydroxides, e.g. metal salts such as alkali or alkaline earth metal salts. A resulting salt can be converted into the free compound.

In the case of compounds that contain basic groups, the salts may also be used for purifying the free compounds. In view of the close relationship between the new compounds in the free form and in the form of their salts, what has been said above and below with reference to the free compounds affects also the corresponding salts wherever this is possible and suitable.

The invention includes also any variant of the process in which an intermediate obtainable at any stage of the process is used as starting material and any remaining steps are carried out or the process is discontinued at any stage thereof, or in which a starting material is formed in situ or used in the form of its salts.

The reactions of this invention are advantageously performed with the use of starting materials that give rise to the preferred compounds mentioned above.

The starting materials are known or are accessible by known methods.

The compounds of the formula

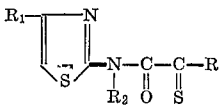

(in which R, $R_1$ and $R_2$ have the above meanings) used as starting materials are new and are likewise included in this invention. They are obtained by known methods, e.g. when a compound of the formula

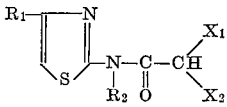

in which $X_1$ and $X_2$ each represents a halogen atom and $R_1$ and $R_2$ have the above meanings—is subjected to the Kindler reaction, that is to say treated with an amine of the formula RH (where R has the above meaning) and sulfur.

The reaction is carried out in the usual manner, preferably by heating, in the presence or absence of a solvent e.g. an alcohol or optionally an excess of the amine concerned which then acts at the same time as solvent.

The above-mentioned compounds of the formula

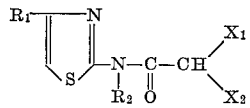

(in which $R_1$, $R_2$, $X_1$ and $X_2$ have the above meanings) are obtained by known methods e.g. by reacting a corresponding 5-unsubstituted 2-amino-thiazole with a halide of an acid of the formula

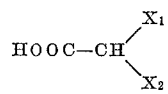

in which $X_1$ and $X_2$ have the above meanings.

The compounds of the formula

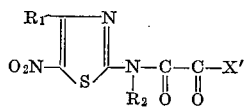

used as starting materials, in which $R_1$, $R_2$ and X' have the meanings given above, may be obtained, for example by reacting a compound of the formula

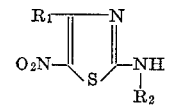

in which $R_1$ and $R_2$ have the meanings given, with a compound of the formula

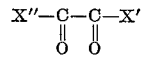

in which X' has the meaning given above and X" represents a halogen atom, particularly a chlorine or bromine atom. The reaction is carried out in the customary manner. The aforementioned starting material of the formula

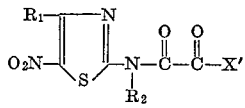

need not be isolated, but may be converted directly without previous isolation into the oxamide according to the process of the invention.

The new compounds may be used, for example, in the form of pharmaceutical preparations containing them in admixture or conjunction with an organic or inorganic, solid or liquid excipient suitable for enteral, parenteral or local administration. Suitable excipients are substances that do not react with the new compounds e.g. water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules, ointments or creams, or in liquid form solutions, suspensions or emulsion. They may be sterilized and/or contain assistants such as preserving, stabilizing, wetting or emulsifying agents, solution promoters, salts for regulating the osmotic pressure or buffers. They may also contain other therapeutically useful substances. The pharmaceutical preparations are formulated by the known methods.

The new compounds may also be used in the form of animal fodder or additives to animal fodder using, for example, the conventional extenders and diluents or animal fodders respectively.

The following examples illustrate the invention.

EXAMPLE 1

3 g. of $N^1,N^1$-1,5-pentylene)-$N^1$-(2-thiazolyl))-1-thio-oxamide are added to a mixture cooled at 0 to 10° C. of 15 ml. of concentrated sulfuric acid and 9 ml. of fuming nitric acid. The batch is stirred for 4 hours at room temperature, care being taken not to allow the temperature to rise above 20° C. The reaction mixture is then poured over 150 ml. of ice-water, whereupon a crystalline precipitate is obtained which is suctioned off. Recrystallization from a large amount of ethanol furnishes $N^1,N^1$-(1,5-pentylene)-$N^2$-(5-nitro-2-thiazolyl)-oxamide of the formula

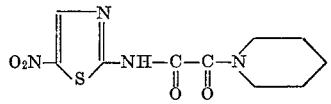

in faintly yellowish crystals melting at 213 to 214° C.

The $N^1,N^1$-(1,5-pentylene)-$N^2$-(2-thiazoyl)-1-thio-oxamide used as starting material is obtained by condensing 2-dichloroacetylamino thiazole with piperidine and sulfur; on recrystallization from benzene the product melts at 249 to 250° C.

2-dichloroacetylamino thiazole is obtained by reacting a solution of 2-aminothiazole in benzene with dichloroacetylchloride. After recrystallization from benzene the product melts at 183 to 184° C.

EXAMPLE 2

3 g. of $N^1,N^1$-(3-oxa-1,5-pentylene)-$N^2$-(2-thiazolyl)-1-thio-oxamide are added while cooling to 0 to 10° C. to 24 ml. of nitrating acid obtained by mixing 15 ml. of concentrated sulfuric acid with 9 ml. of fuming nitric acid. The batch is stirred for 4 hours at room temperature, while taking care that the temperature does not rise above 20° C. The reaction mixture is then poured over 150 ml. of ice-water, whereupon a crystalline precipitate forms and is suctioned off. Recrystallization from a large amount of ethanol furnishes $N^1,N^1$-(3-oxa-1,5-pentylene)-$N^2$-(5-nitro-2-thiazolyl)-oxamide of the formula

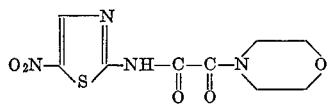

in yellowish crystals melting at 239° C.

The $N^1,N^1$-(3-oxa-1,5-pentylene)-$N^2$-(2-thiazolyl)-1-thio-oxamide used as starting material is obtained by condensing 2-dichloroacetylamino thiazole with morpholino and sulphur; after recrystallization from benzene it melts at 260 to 261° C.

EXAMPLE 3

3 g. of $N^1,N^1$-(3-methyl-3-aza-1,5-pentylene)-$N^2$-(2-thiazolyl)-1-thio-oxamide are added with cooling to 0 to 10° C. to 24 ml. of nitrating acid prepared by mixing 15 ml. of concentrated sulfuric acid with 9 ml. of fuming nitric acid. After 15 minutes the cooling bath is removed and the batch stirred for 4 hours at room temperature, ensuring that the internal temperature does not rise above 20° C. The reaction mixture is then poured over 100 ml. of ice-water and the acid solution adjusted to pH 6, while being cooled with an ice+salt mixture, by stirring in 10 N-sodium hydroxide solution. The resulting solution is extracted with 2×300 ml. of chloroform. The chloroform solution is dried with anhydrous sodium sulfate, evaporated, and the residue is recrystallized from a large amount of ethanol, to yield $N^1,N^1$-(3-methyl-3-aza - 1,5 - pentylene) - $N^2$ - (5 - nitro - 2 - thiazolyl)-oxamide of the formula

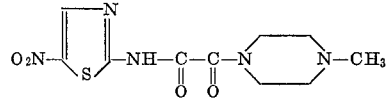

in yellowish crystals melting at 260 to 262° C.

Reaction with ethanolic hydrochloric acid furnishes the hydrochloride melting at 280° C. with decomposition.

The starting material—$N^1,N^1$-(3-methyl-3-aza-1,5-pentylene)-$N^2$-(2-thiazoyl)-1-thio-oxamide—is obtained by condensing 2-dichloroacetylamino thiazole with $N'$-methylpiperazine and sulfur. After recrystallization from ethanol the product melts at 203 to 204° C.

EXAMPLE 4

7.25 g. of 5-nitro-2-aminothiazole, dissolved in 100 ml. of absolute tetrahydrofuran, are added dropwise to a solution of 6.35 g. of oxalyl chloride in 150 ml. of absolute tetrahydrofuran in the course of 30 minutes at a temperature of 20° C. Stirring is carried on for half an hour at room temperature, and a solution of 3.7 g. of n-butylamine in 20 ml. of absolute tetrahydrofuran is then added dropwise. The reaction mixture is heated at the boil for one hour with stirring. After cooling, the precipitate is filtered with suction and washed with water. By recrystallization from much ethanol there is obtained $N^1$-(n-butyl)-$N^2$-(5-nitro - 2 - thiazolyl)-oxamide of the formula

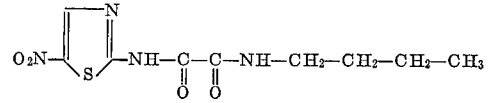

in the form of white crystals melting at 250 to 251° C. with decomposition.

EXAMPLE 5

7.25 g. of 5-nitro-2-aminothiazole, dissolved in 100 ml. of absolute tetrahydrofuran, are added dropwise to a solution of 6.35 g. of oxalyl chloride in 150 ml. of absolute tetrahydrofuran in the course of 30 minutes at a temperature of 20° C. Stirring is continued for half an hour at room temperature, and a solution of 6.05 g. of methyl-benzylamine in 20 ml. of absolute tetrahydrofuran is then added dropwise in the course of 10 minutes at room temperature. The reaction mixture is then heated at the boil for 1 hour. After cooling, the precipitated salt is filtered with suction and the tetrahydrofuran solution poured into 1.5 ml. of water and the precipitate, after solidifying, is filtered with suction. The resulting product is recrystallized from ethanol while the insoluble portion is separated, to yield $N^1$-methyl-$N^1$-benzyl-$N^2$-(5-nitro-2-thiazolyl)-oxamide of the formula

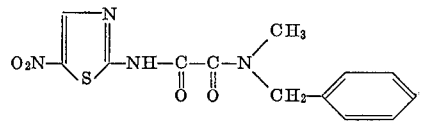

in the form of white crystals melting at 168–170° C.

EXAMPLE 6

7.25 g. of 5-nitro-2-aminothiazole, dissolved in 100 ml. of absolute tetrahydrofuran, are added dropwise to a solution of 6.35 g. of oxalyl chloride in 100 ml. of absolute tetrahydrofuran in the course of 30 minutes at a temperature of 20° C. Stirring is continued for half an hour at room temperature, and a solution of 6.5 g. of 2:6-dimethyl-thiomorpholine in 20 ml. of absolute tetrahydrofuran is then added dropwise in the course of 10 minutes at room temperature. The reaction mixture is then heated at the boil for 1 hour with stirring. The reaction solution is cooled, poured into 2 liters of water and the precipitate filtered with suction. The resulting product is dissolved in much hot ethanol and the insoluble portion separated. From the ethanol there is obtained $N^1$:$N^1$-(3-thia-2:4-dimethyl - 1:5 - pentylene)-$N^2$-(5-nitro-2-thiazolyl)-oxamide of the formula

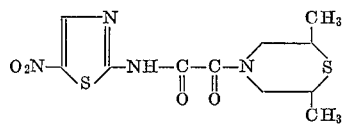

in the form of slightly yellowish crystals melting at 190–192° C.

EXAMPLE 7

77.25 g. of 5-nitro-2-aminothiazole, dissolved in 100 ml. of absolute tetrahydrofuran, are added to a solution of 6.35 g. of oxalyl chloride in 100 ml. of absolute tetrahydrofuran in the course of 30 minutes at a temperature of 20° C. Stirring is continued for half an hour at room temperature, and a solution of 4.75 g. of morpholine in 20 ml. of absolute tetrahydrofuran is then added in the course of 10 minutes at room temperature. The reaction mixture is then heated at the boil for one hour with stirring. The precipitated reaction product is cooled, filtered with suction and triturated with water. Extraction is carried out with much ethanol and the insoluble product is separated. From the ethanol $N^1$:$N^1$-(3-oxa-1:5-pentylene) - $N^2$-(5-nitro-2-thiazolyl)-oxamide crystallizes in the form of yellowish crystals melting at 239–240° C. This compound is identical with the product described in Example 2.

EXAMPLE 8

7.25 g. of 5-nitro-2-aminothiazole, dissolved in 100 ml. of absolute tetrahydrofuran, are added dropwise to a solution of 6.35 g. of oxalyl chloride in 150 ml. of absolute tetrahydrofuran in the course of 30 minutes at a temperature of 20° C. Stirring is continued for half an hour at room temperature, and a solution of 8.1 g. of N-phenyl-piperazine in 20 ml. of absolute tetrahydrofuran is then added dropwise in the course of 10 minutes at room temperature. The reaction mixture is then heated at the boil for one hour with stirring. The precipitate is cooled, filtered with suction and treated with water. The resulting product is recrystallized from very much ethanol while the insoluble portion is separated. $N^1$:$N^1$-(3-phenyl-3-aza-1:5-pentylene)-$N^2$-(5-nitro-2-thiazolyl)-oxamide of the formula

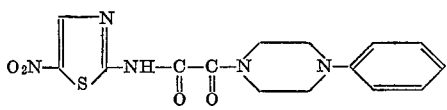

is obtained in the form of brownish crystals melting at 250 to 251° C. with decomposition.

EXAMPLE 9

7.25 g. of 5-nitro-2-aminothiazole, dissolved in 100 ml. of absolute tetrahydrofuran, are added to a solution of 6.35 g. of oxalyl chloride in 100 ml. of absolute tetrahydrofuran at 16° C. in the course of 30 minutes. The batch is then stirred for 30 minutes at room temperature, and a solution of 4 g. of anhydrous β-chloroethylamine, which has been prepared from the hydrochloride immediately before the reaction while cooling well, in 20 ml. of absolute tetrahydrofuran is added dropwise in the course of 10 minutes. The batch is gradually heated to the boil in the course of one hour, and boiling under reflux is continued for half an hour with stirring. The resulting turbidity is filtered off and the clear filtrate cooled to 0° C., $N^1$-(β-chlorethyl)-$N^2$-(5-nitro-2-thiazolyl)-oxamide of the formula

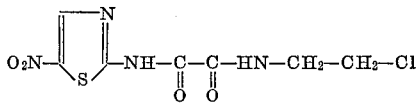

crystallizing out; the product is recrystallized from much alcohol and melts at 257–258° C. with decomposition.

EXAMPLE 10

Tablets containing 500 mg. of $N^1$,$N^1$-(3-oxa-1,5-pentylene)-$N^2$-(5-nitro-2-thiazolyl)-oxamide may be prepared with the following ingredients:

| | Per tablet, mg. |
|---|---|
| $N^1$,$N^1$-(3-oxa-1,5-pentylene)-$N^2$-(5-nitro-2-thiazolyl)-oxamide | 500.0 |
| Wheat starch | 40.0 |
| Colloidal silicic acid with hydrolyzed starch | 30.0 |
| Arrowroot | 30.0 |
| Magnesium stearate | 6.0 |
| Talc | 19.0 |
| | 625.0 |

Method.—Half of the wheat starch is pasted with four times the quantity of water on a water-bath. $N^1$,$N^1$-(3-oxa - 1,5-pentylene)-$N^2$-(5-nitro-2-thiazolyl)-oxamide is homogeneously mixed with the remaining starch, then kneaded with the paste and with a sufficient quantity of water to form a plastic mass. The colloidal silicic acid with hydrolyzed starch is then worked in in portions.

The plastic mass is passed through a sieve having a 4–5 mm. mesh and dried at 45° C. The dried granulate is passed through a sieve of 0.8–1.4 mm. mesh and the remaining disintegrating and lubrication agents are then added. After further homogenization tablets having a diameter of 11.5 mm. and weighing 625 mg. are compressed in the conventional manner.

EXAMPLE 11

At a temperature of 20–22° C., 14.5 g. of a solution of 5-nitro-2-aminothiazole in 200 ml. of absolute tetrahydrofuran is added dropwise to a solution of 12.7 g. of oxalyl chloride in 300 ml. of absolute tetrahydrofuran. Stirring is continued for half an hour at room temperature. After that, at a temperature of 15–25° C., ammonia gas is introduced until the suspension has a pH of about 6. Within one hour, the batch is then gradually heated to the boil, and the product which precipitates is filtered off hot. The filtrate is crystallized by being concentrated to a volume of about 70 ml. under reduced pressure. The crystalline product is filtered off with suction, washed with water, and recrystallized from a large quantity of ethanol. In this manner, N-(5-nitro-2-thiazolyl)-oxamide of the formula

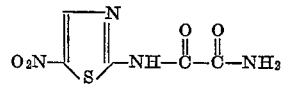

is obtained in the form of pale yellow crystals melting at 270° C. (with decomposition).

EXAMPLE 12

At a temperature of 15–17° C., a soluton of 14.5 g. of 5-nitro-2-aminothiazole in 200 ml. of absolute tetrahydrofuran is added dropwise to a solution of 12.7 g. of oxalyl chloride in 200 ml. of absolute tetrahydrofuran. The mixture is stirred on for half an hour at the same temperature, a solution of 13.5 g. of dimethylamine in 100 ml. of absolute tetrahydrofuran is added drop by drop. Stirring is continued for half an hour at room temperature, the batch then slowly heated to the boil, and kept at the boiling temperature for half an hour. After cooling, the precipitated product is filtered off, washed with water, and recrystallized from much ethanol. There is obtained in this manner $N^1,N^1$-dimethyl-$N^2$-(5-nitro-2-thiazolyl)-oxamide of the formula

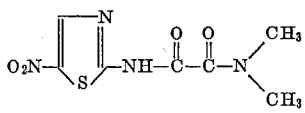

in the form of pale yellow crystals melting at 222–224° C.

EXAMPLE 13

At a temperature of 15–17° C., a solution of 14.5 g. of 5-nitro-2-aminothiazole in 200 ml. of absolute tetrahydrofuran is added dropwise to a solution of 12.7 g. of oxalyl chloride in 200 ml. of absolute tetrahydrofuran. The batch is stirred on for half an hour at the same temperature, after which, at room temperature, a solution of 9.3 g. of methylamine in 100 ml. of absolute tetrahydrofuran is added drop by drop. Stirring is continued for half an hour at room temperature, the batch then slowly heated to the boil, and kept at the boiling temperature for half an hour. After cooling, the precipitate which has formed in filtered off and washed with water. The product is dried and stirred with 500 ml. of boiling ethanol. $N^1$-methyl-$N^2$-(5-nitro-2-thiazolyl)-oxamide of the formula

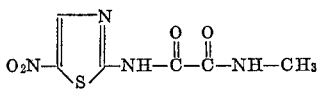

is so obtained in the form of yellow crystals of melting point 275° C. (decomposition).

EXAMPLE 14

Tablets containing 500 mg. of N-(5-nitro-2-thiazolyl)-oxamide may be prepared with the following ingredients:

| | Per tablet, mg. |
|---|---|
| N-(5-nitro-2-thiazolyl)-oxamide | 500.0 |
| Wheat starch | 40.0 |
| Colloidal silicic acid with hydrolyzed starch | 30.0 |
| Arrowoot | 30.0 |
| Magnesium stearate | 6.0 |
| Talc | 19.0 |
| | 625.0 |

Method.—Half of the wheat starch is pasted with four times the quantity of water on a water-bath. N-(5-nitro-2-thiazolyl)-oxamide is homogeneously mixed with the remaining starch, then kneaded with the paste and with a sufficient quantity of water to form a plastic mass. The colloidal silicic acid with hydrolyzed starch is then worked in in portions.

The plastic mass is passed through a sieve having a 4–5 mm. mesh and dried at 45° C. The dried granulate is passed through a sieve of 0.8–1.4 mm. mesh and the remaining disintegrating and lubrication agents are then added. After further homogenization tablets having a diameter of 11.5 mm. and weighing 625 mg. are compressed in the conventional manner.

In an analogous manner tablets may be prepared containing $N^1$-methyl-$N^2$-(5 - nitro - 2-thiazolyl)-oxamide or $N^1,N^1$-dimethyl-$N^2$-(5-nitro-2-thiazolyl)-oxamide.

We claim:

1. A member selected from the group consisting of a compound of the formula

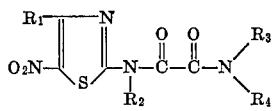

in which $R_1$ and $R_2$ each stands for a member selected from the group consisting of lower alkyl and hydrogen and $R_3$ and $R_4$ each stands for a member selected from the group consisting of hydrogen, lower alkyl, lower alkoxy-lower alkyl, hydroxy-lower alkyl, halogeno-lower alkyl, lower alkenyl, cyclo-lower alky, cyclo-lower alkyl-lower alkyl, cyclo-lower alkenyl, cyclo-lower alkenyl-lower alkyl, phenyl-lower alkyl, lower alkyl-phenyl-lower alkyl, lower alkoxy-phenyl-lower alkyl, halogeno-phenyl-lower alkyl, trifluoromethyl-phenyl-lower alkyl, and, when taken together, for a member selected from the group consisting of lower alkylene, having 4 to 7 chain members, and lower oxaalkylene, lower aza-alkylene, lower thia-alkylene and N-phenyl-lower aza-alkylene each having 5 to 7 chain members and in which the heteroatoms are separated from the amino nitrogen atom by at least two carbon atoms and therapeutically acceptable acid addition salts of such compounds in which $R_3$ and $R_4$ together stand for lower mono-azaalkylene or N-phenyl-lower mono-aza-alkylene.

2. A compound as claimed in claim 1, wherein $R_1$ and $R_2$ each stand for hydrogen and

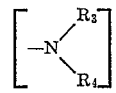

$R_3$ and $R_4$ each stands for a member selected from the group consisting of hydrogen and lower alkyl, at least one being lower alkyl, and, when taken together, for a member selected from the group consisting of lower alkylene having 4 to 7 chain members, and lower oxaalkylene, lower thia-alkylene and lower aza-alkylene each having 5 to 7 chain members and in which the hetero atoms are separated from the amino nitrogen atom by at least two carbon atoms.

3. A compound as claimed in claim 1, in which $R_1$ and $R_2$ each stands for hydrogen and

for a member selected from the group consisting of di-lower alkylamino, pyrrolidino, morpholino, N-lower alkyl-piperazino and piperidino.

4. A compound as claimed in claim 1, wherein $R_1$ and $R_2$ stand for hydrogen and

for a member selected from the group consisting of piperidino and morpholino.

5. A compound as claimed in claim 1, wherein $R_1$ and $R_2$ stand for hydrogen and

for a member selected from the group consisting of N-methyl-piperazino and N-phenyl-piperazino, or an acid addition salt thereof.

6. A compound as claimed in claim 1, wherein $R_1$ and $R_2$ stand for hydrogen and

for a member selected from the group consisting of n-butylamino, benzyl-methylamino, 2,6-dimethyl-thiomorpholino and β-chloroethylamino.

7. A compound as claimed in claim 1, wherein $R_1$ and $R_2$ stand for hydrogen and $R_3$ and $R_4$ each stands for a member selected from the group consisting of hydrogen and lower alkyl.

8. A compound as claimed in claim 1 which compound is N-(5-nitro-2-thiazolyl)-oxamide.

9. A compound as claimed in claim 1 which compound is $N^1$-methyl-$N^2$-(5-nitro-2-thiazolyl)-oxamide.

10. A compound as claimed in claim 1 which compound is $N^1,N^1$ - dimethyl - $N^2$ - (5 - nitro - 2 - thiazolyl)-oxamide.

11. A compound of the formula

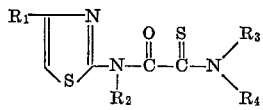

in which $R_1$ and $R_2$ each stands for a member selected from the group consisting of lower alkyl and hydrogen and $R_3$ and $R_4$ each stands for a member selected from the group consisting of hydrogen, lower alkyl, lower alkoxy-lower alkyl, hydroxy-lower alkyl, halogeno-lower alkyl, lower alkenyl, cyclo-lower alkyl, cyclo-lower akyl-lower alkyl, cyclo-lower alkenyl, cyclo-lower alkenyl-lower alkyl, phenyl-lower alkyl, lower alkyl-pheny-lower alkyl, lower alkoxy-phenyl-lower alkyl, halogeno-phenyl-lower alkyl, trifluoromethyl-phenyl-lower alkyl, and, when taken together, for a member selected from the group consisting of lower alkylene, lower oxaalkylene, lower aza-alkylene, lower thia-alkylene and N-phenyl-lower aza-alkylene.

12. A compound as claimed in claim 11, wherein $R_1$ and $R_2$ each stands for hydrogen and

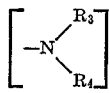

$R_3$ and $R_4$ each stands for a member selected from the group consisting of mono-lower alkylamino, di-lower alkylamino, and, when taken together, for a member selected from the group consisting of lower alkylene having 4 to 7 chain members, and lower oxa-alkylene, lower thia-alkylene and lower aza-alkylene, each having 5 to 7 chain members and in which the hetero atoms are separated from the amino nitrogen atom by at least two carbon atoms.

13. A compound as claimed in claim 11, wherein $R_1$ and $R_2$ stand for hydrogen and

for a member selected from the group consisting of morpholino and dimethylamino.

References Cited
UNITED STATES PATENTS

| | | | |
|---|---|---|---|
| 2,755,285 | 7/1956 | O'Neill et al. | 260—306.8 |
| 3,107,256 | 10/1963 | Brown et al. | 260—306.8 |

ALEX MAZEL, Primary Examiner

R. J. GALLAGHER, Assistant Examiner

U.S. Cl. X.R.

260—247.1, 268, 293.4, 306.8; 424—232, 246, 248, 250, 267, 270

PO-1050
(5/69)

UNITED STATES PATENT OFFICE
CERTIFICATE OF CORRECTION

Patent No. 3,538,089     Dated November 3, 1970

Inventor(s) PAUL SCHMIDT ET AL

It is certified that error appears in the above-identified patent and that said Letters Patent are hereby corrected as shown below:

Column 9, line 75, delete "alky" and insert --- alkyl ---.

Column 10, claim 2, delete the brackets and the formula; line 56, delete "an" and insert --- a therapeutically acceptable ---.

Column 11, line 18, delete "pheny" and insert --- phenyl ---; line 22, after "lower alkylene," insert --- having 4 to 7 chain members, and ---; line 24, after "alkylene" insert --- , each having 5 to 7 chain members and in which the hetero atoms are separated from the amino nitrogen atom by at least two carbon atoms ---; Claim 12, delete the brackets and the formula.

Column 12, lines 2 to 3, delete "mono-lower alkylamino, di-lower alkylamino" and insert --- hydrogen and lower alkyl, at least one being lower alkyl ---.

Signed and sealed this 14th day of September 1971.

(SEAL)
Attest:

EDWARD M. FLETCHER, JR.
Attesting Officer

ROBERT GOTTSCHALK
Acting Commissioner of Patents